Oct. 30, 1956

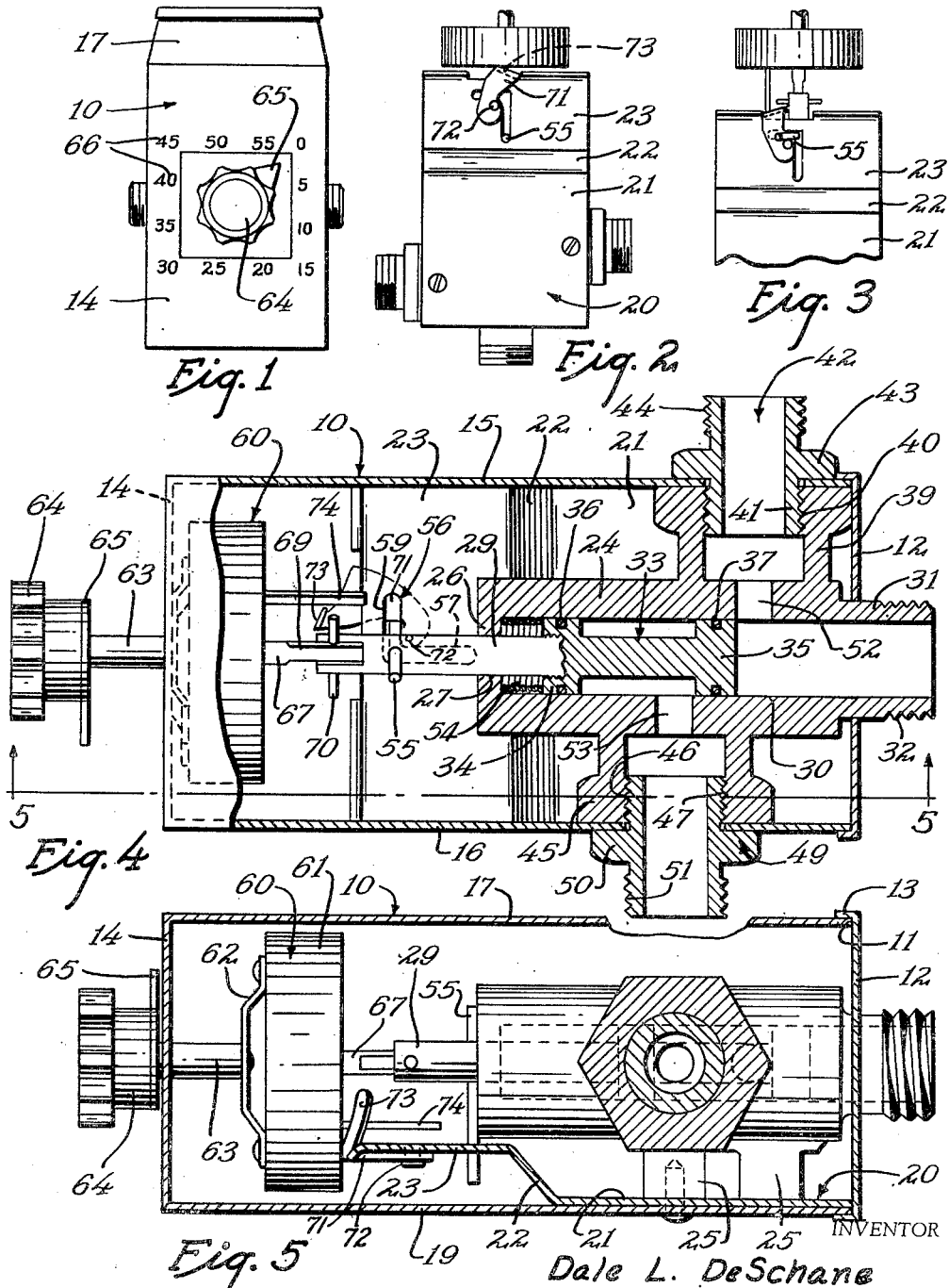

D. L. DE SCHANE ET AL 2,768,683

TIMING VALVE

Filed Dec. 7, 1951

INVENTOR
Dale L. DeSchane
Oliver W. Ness
BY Robert M. Dunning
ATTORNEY

United States Patent Office 2,768,683
Patented Oct. 30, 1956

2,768,683

TIMING VALVE

Dale L. De Schane and Oliver W. Ness, Minneapolis, Minn., assignors to Flo-Matic Valve Co., St. Paul, Minn., a corporation of Minnesota Application December 7, 1951, Serial No. 260,422

9 Claims. (Cl. 161—7)

This invention relates to an improvement in timing valves and deals particularly with a two-way valve construction which may be automatically time controlled.

A two-way liquid valve which may move between two extreme positions and which may connect one port to a pair of other ports selectively is desirable in many fields. For example, in water softening equipment it is necessary to flush the tank of material capable of removing impurities from the water with fresh water before connecting the softening tank in the water system of the home or building. From time to time salt, or some similar chemical is used to form brine capable of removing the impurities from the Zeolite or other such material. Water is then allowed to flow through the tank for a predetermined period of time to remove the salt from the system. A two-way valve capable of controlling the flow of fluid for a predetermined period of time is advantageous in such a system as it permits the operator to leave the system unattended during the flushing period.

An object of the present invention resides in the provision of a two-way valve having an inlet and a pair of outlts and in providing a valve member capable of connecting either of the outlets to the inlet. Timing mechanism is provided for controlling the time during which the inlet remains connected to one outlet. This timing means permits the return of the valve to its other extreme position after this predetermined time period.

A feature of the present invention resides in the provision of a valve having a valve plunger which is longitudinally slidable in its cylinder and which may block the flow of fluid to either of the outlets alternatively. This plunger is encircled by an O-ring which provides a seal between the plunger and the cylinder wall and provides a simple valve structure which can move with relatively little friction.

A further feature of the present invention resides in the provision of a latch member on the valve plunger which is engageable with a fixed abutment in one extreme position of the valve to hold the valve in this extreme position against the tension of a resilient means. A lever is provided for disengaging the latch member from the fixed abutment and timing mechanism actuates the lever. The lever arrangement is such that a relatively small force can move the latch member out of engagement with its abutment.

A further feature of the present invention resides in the provision of a valve mechanism supplied with an operating plunger rod or piston rod and in interposing a timing mechanism in the connection between the valve rod and the operating knob. In changing the position of the valve member, a pull upon the operating knob acts through the timing mechanism to move the plunger. This simplifies the structure and requires less parts than would otherwise be required for a structure of this type.

These and other objects and novel features of the present invention will be more clearly and fully set forth in the following specification and claims.

In the drawings forming a part of the specification:

Figure 1 is a front elevational view of the casing showing the general construction of the assembled device.

Figure 2 is a bottom plan view of the valve and timing mechanism showing the lever for actuating the valve controlling latch.

Figure 3 is a view somewhat similar to Figure 2 showing the latch operating lever and timing mechanism in a different position.

Figure 4 is a sectional view through the valve and casing, this view showing the valve in one extreme position and the timing mechanism in operation.

Figure 5 is a sectional view through the valve casing showing the valve and timing mechanism in elevation, the position of the section being indicated by the line 5—5 of Figure 4.

Figure 6:
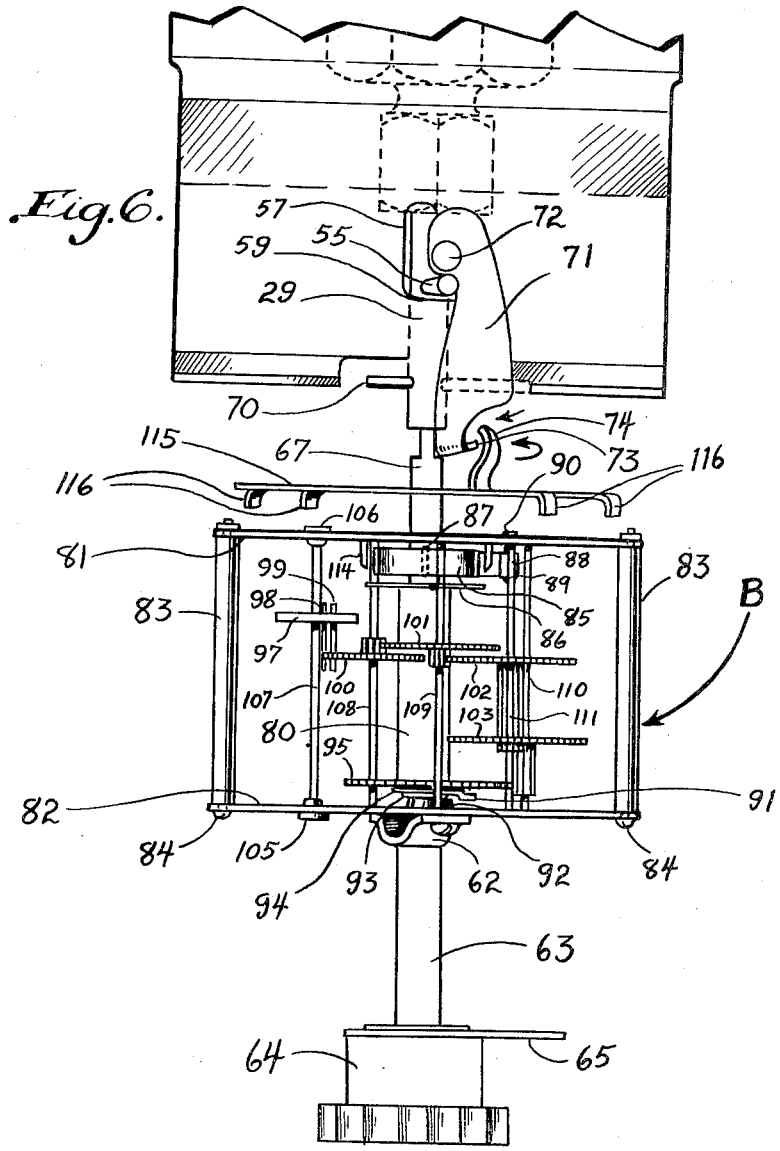
Figure 6 is a partially expanded and partially exploded top plan view of detail showing the clock, shaft and lever arrangement.

The timing valve in its complete form is best illustrated in Figures 4 and 5 of the drawings. It will be noted that the valve is enclosed in a generally rectangular casing 10 which is provided with an open end 11. This open end is normally closed by means of a closure panel 12. The closure panel 12 is provided with rectangularly arranged marginal flanges 13 which are designed to telescope with the rectangular body 10 and to close the normally open end of the housing.

The housing 10 is provided with a front wall 14 which is in parallel relation to the closure panel 12. The housing also includes parallel side walls 15 and 16 as well as parallel top and bottom walls 17 and 19 respectively. In general the valve structure is mounted upon the bottom wall 19.

A base plate 20 is designed to rest upon the bottom wall 19 and to be secured thereto. This base 20 includes a flat bottom portion 21 which is designed to extend in surface contact with the bottom wall 19. An upwardly inclined off-set portion 22 is secured to one end of the base portion 21 and an end portion 23 is attached to the inclined portion 22 to extend in parallel relationship to the bottom portion 21.

The valve includes an elongated valve cylinder 24 which is provided with downwardly projecting lugs such as 25 which extend into contact with the lower portion 21 of the base 20 and act to support the cylinder in spaced relation to the supporting base 20. The cylinder 24 is provided with an end closure 26 at one end thereof. An aperture 27 extends axially through the end 26 to accommodate a piston rod 29. The piston rod 29 is freely slidable through the aperture 27 so that the inner portion of the valve plunger may move longitudinally of the cylinder 24. The cylinder 24 is provided with a cylindrical bore 30 which extends axially thereof. A tubular extension 31 is provided at one end of the cylinder 24. This tubular extension 31 is externally threaded as indicated at 32 to accommodate a coupling of a suitable type. The bore 30 is preferably of constant diameter throughout its length and throughout the length of the extension 31.

The valve plunger is indicated in general by the numeral 33. This valve plunger is provided with two spaced piston lobes 34 and 35. Each of these lobes is circumferentially grooved to accommodate an O-ring. The O-ring encircling the piston lobe 34 is indicated at 36 while the O-ring encircling the piston lobe 35 is indicated at 37.

A tubular boss 39 extends on an axis intersecting the axis of the cylinder 24 and at right angles thereto. This tubular boss 39 is internally threaded as indicated at 40. The boss is designed to accommodate the externally threaded end 41 of a nipple 42. The nipple 42 is preferably provided with a portion of enlarged size intermediate its ends which is hexagonally shaped. This enlarged portion is indicated at 43. The outer end of the nipple 42 is externally threaded as indicated at 44 to accommodate a suitable fitting.

It will be noted that the wall 15 of the casing is apertured in registry with the tubular boss 39 to accommodate the threaded end 41 of the nipple 42. The enlarged hexagonal portion 43 of the nipple permits this nipple to be tightened so that the wall 15 is clamped between the hexagonal portion 43 and the end of the tubular boss 39 to assist in holding the valve structure in place.

A second tubular boss 45 extends transversely from the cylinder 24 and has its axis intersecting the axis of the cylinder 24. The tubular boss 45 is off-set from the boss 39 previously described. The boss 45 is internally threaded as indicated at 46 to accommodate the externally threaded end 47 of a nipple 49. The nipple 49 is provided with an enlarged portion 50 intermediate its ends. This enlarged portion 50 is preferably hexagonal in shape so as to permit a wrench or other tool to be applied thereto for tightening the nipple into place. The nipple 49 is also provided with an externally threaded outer end 51 by means of which the nipple may be attached to a coupling of a suitable type.

The interior of the tubular boss 39 is connected to the bore 30 of the cylinder 24 by means of a port 52. The boss 45 is also connected to the bore 30 of the cylinder 24 by a port 53. The ports 52 and 53 are in longitudinal spaced relation in the cylinder 24, the distance between these ports being substantially equal to the width of the piston lobe 35. Obviously the distance between these ports could be increased as long as the piston lobe 35 could extend therebetween.

The piston lobes 34 and 35 are spaced apart a distance at least equal to the distance between the outer sides of the ports 52 and 53. In other words, the spacing of the piston lobes is sufficient to permit a path for liquid from one port 52 to the other port 53 when the valve stem 29 is in one extreme position. A spring 54 is provided extending between the end 26 of the cylinder 24 and the piston lobe 34 to normally urge the pistons in this extreme position. A pin 55 extends through the valve stem 29 and is engageable with the end of the cylinder 24 to limit movement of the pistons toward the right as viewed in Figure 4 of the drawings.

The end 23 of the base member 20 is provided with an L-shaped slot 56 in which the pin 55 may travel. The slot 56 is provided with a portion 57 extending parallel to the axis of the valve stem 29 so that during this portion of the travel the valve stem is held from rotation. The slot 56 also includes a laterally extending end portion 59 into which the pin 55 may extend. When the pin 55 is engaged in the angularly extending end 59 of the slot 56, the edge of the slot acts as a shoulder or abutment for preventing the longitudinal movement of the valve stem 29. Obviously the valve stem must be rotated somewhat in order that the pin 55 engage in the angular portion 59 of the slot 56.

The timing mechanism 60 is provided, which includes suitable clock mechanism for timing the operation of the valve. The casing 61 of the timing mechanism is connected to a yoke 62 which in turn is connected to a shaft 63. The shaft 63 extends through the front wall 14 of the casing 10 and is provided on its outer extremity with a knob 64 by means of which the shaft and the mechanism housing 61 may be rotated. A pointer 65 is provided adjacent to the knob 64. The front panel 14 of the casing 10 is provided with identifying indicia 66 which indicate a series of equal time intervals. The pointer 65 may be rotated to be directed at any of the spaced numerals comprising the indicia 66.

A stub shaft 67 extends from the timing mechanism housing 60 in coaxial relation with the shaft 63. The stub shaft 67 is provided with a reduced diameter end 69 which is pin connected or otherwise connected at 70 to the valve shaft or rod 29. In the particular embodiment illustrated the timing mechanism includes a spring having one end thereof connected to the casing 61 so that rotation of the casing 61 tends to wind the clock spring. The other end of the spring is connected to the hub of a train of timing gears which eventually connect with a gear mounted upon the shaft 67. In the normal use of such a timing mechanism the casing 60 would be held stationary, and the clock mechanism would tend to rotate the shaft 67. However, in the present instance, the shaft 67 tends to resist rotation due to the frictional engagement of the pin 55 against the edge of the portion 59 of the slot 56. Thus the casing 61 will rotate and rotation of the casing 61 will rotate the shaft 63 and accordingly the pointer 65. The result of this action is to return the pointer 65 toward the zero mark on the indicia 66 of the casing.

In Figure 2 of the drawing, it will be noted that we provide a lever 71 which is pivotally connected to the end portion 23 of the base 20 by a suitable pivot 72. The lever 71 is provided with an upturned end 73 which is best illustrated in Figure 5 of the drawings. This upturned lever end 73 is inclined upwardly toward the shaft 67 and the valve stem 29. An arm 74 is secured in fixed relation to the timer housing 61 to extend substantially parallel to the axis thereof. This arm 74 is designed to engage against the upturned end 73 of the lever 71 and to pivot this lever about its pivot point 72.

The operation of the timing valve will now be described. The valve 33 is normally in the position shown in dotted outline in Figure 5 of the drawings. When the pistons of the valve are in the position shown in Figure 5, the piston lobe 35 is outwardly of the port 52 to close any connection between the port 52 and the tubular extension 31 of the valve body. The piston lobe 34 is to the left of the port 53 thus forming a connection between the ports 52 and 53 through the bore 30 of the cylinder 24. In other words in this position there is a fluid connection between the interior of the boss 39 and the interior of the boss 45 through a portion of the cylinder bore.

When it is desired to change the position of the valve for a predetermined time, the knob 64 is grasped and pulled outwardly. This moves the valve from the position indicated in Figure 5 of the drawings to the position shown in Figure 4. When the valve reaches its outer extremity as determined by the engagement of the pin 55 with the end of the longitudinally extending portion 57 of the slot 56, the valve operating knob 64 is turned in a clockwise direction until the pointer 65 points to the proper numeral innicating a desired time interval. For example if the knob 64 is rotated through 180 degrees, the timer illustrated will designate a thirty minute interval. Rotation of the knob 64 in a clockwise direction will pivot the clock mechanism housing 60 and acts through the various timing gears to rotate the shaft 67. In this position the valve stem 29 may be rotated with comparative ease as rotative movement of this part is restricted only by the frictional engagement of the valve stem and valve in the cylinder 24.

Rotation of the pin 55 causes this pin to be moved against the horizontal edge portion of the lever 71. This movement pivots the lever 71 into the position shown in Figure 3 of the drawings and permits the pin 55 to be engaged in the laterally extending portion 59 of the slot 56. It will be noted that rotation of the housing 60 removes the fixed arm 74 on the timer housing 60 from its engagement with the end 73 of the lever 71, thus permitting this pivotal movement of the lever. Further rotation of the knob 64 can no longer rotate the pin 55 and accordingly acts to wind up the spring within the clock mechanism 60. The greater the distance of rotation of the pointer 65, the greater amount the clock spring is wound up and the greater will be the travel of the arm 74 away from the lever 71.

After the pointer 65 has been set to the proper time interval the knob is released, but remains in its outer position as indicated in Figure 4. The clock mechanism is set into operation and as the shaft 67 resists rotation more than the shaft 63 and the mechanism housing, the housing 60 is slowly rotated about its axis, the pointer 65 pivoting toward its zero position. As the housing 60 approaches its starting position, the arm 74 engages the upwardly extending end 73 of the lever 71 and pivots this lever in a clockwise direction as viewed in Figures 2 and 3. The arm 74 acts to pivot the lever 71 and the side of the lever engages against the pin 55 and rotates this pin and the valve shaft 29. It will be noted that the lever 71 engages the pin 55 closely adjacent the pivot point 72 of the lever while the arm 74 engages the lever at a considerably greater distance from the pivot. As a result leverage is created tending to operate the pin 55 to rotate the valve shaft and the valve connected thereto.

When the lever 71 has moved a sufficient distance, the pin 55 is disengaged from the lateral portion 59 of the slot 56. At this time the spring 54 will tend to push the valve to the starting position illustrated in Figure 5. As soon as the pin 55 is in alignment with the longitudinally extending portion 57 of the slot 56 the valve is free to move into its other extreme position.

The device described may be used for various purposes. For example, water softening systems require the necessity of removing impurities from the Zeolite or other material used in removing impurities from the water. This is often done by supplying the water softening tank with salt and in flushing the tank with brine formed by the dissolving of the salt in water. Obviously it is necessary to drain off the brine and the impurities picked up thereby, and in most instances this brine is directed to the sewer. After a predetermined period of time the salt has all been dissolved and the outlet of the water softening tank is connected to the water system of the house or building in which the softening tank is located. The timing valve serves excellently for this purpose and it avoids the necessity of manually turning off the discharge connection to the sewer and turning on the discharge connection with the water line of the house.

In such an event the nipple 42 is connected to the outlet of the water softening tank, the connection 32 is attached by suitable means to a sewer or the like, and the nipple 49 is connected to the water line leading to the faucets and other water connections in the house or building. After the salt has been added to the water softening tank, the valve is set into operation by pulling outwardly on the knob 64 to move the pin 55 longitudinally of the slot portion 57 and then rotating the knob 64. Rotation of the knob 64 first moves the pin 55 into the transverse portion 59 of the slot 56, thus causing the pin 55 which acts as a latch member, to engage against a fixed abutment on the base 20. The pin 55 also pivots the lever 71 from the position indicated in Figure 2 to the position indicated in Figure 3. Further rotative movement of the knob 64 acts to wind the spring of the timing mechanism and rotates the timing mechanism casing 61 relative to the shaft 67. The knob 64 is rotated until the pointer 65 indicates the desired time interval.

When the knob 64 is released the timing mechanism starts into operation and starts rotating the casing 61 and knob 64 in a reverse direction or counter-clockwise direction as viewed in Figure 1. Rotation of the casing 61 acts to rotate the arm 74. Eventually when the timing mechanism has almost completed its time interval, the arm 74 engages the lever end 73 and pivots this lever from the position shown in Figure 3 toward the position shown in Figure 2. This action causes the lever 71 to engage against the end of the pin 55 rotating the valve rod 29 and moving the pin or latch member 55 laterally in the slot 59. As soon as the latch member 55 becomes aligned with the longitudinally extending portion 57 of the slot 56, the spring 54 moves the valve plunger 33 to the right as viewed in Figure 4, thus closing the connection between the port 52 and the outlet port through the extension 31 and connects the port 52 with the port 53.

In order to better illustrate the operation of the structure herein described and illustrated, and the attachment of the rotatable casing and clockwork about the extension 67 of valve stem or piston rod 29, there is shown in Figure 6 a detail of the elements which cooperate to perform their respective functions.

The clock mechanism 60, as represented by timing clockwork B, is mounted to turn on shaft 67 about its integral enlarged ring end 80. This clockwork B comprises a pair of end plates 81 and 82 adapted to be held together by conventional bushings 83 mounted on the usual bolts and screw elements 84. The end plate 81 encircles shaft 67 with the inner side adapted to engage against a spring 85 and hold the spring 85 in sliding engagement against sliding washer 86 which abuts the inner shoulder of ring end 80. The spring 85 has its inner end (not shown) locked in the slot 87 in shaft 67 and in its opposite outer end 88 secured to pin or screw 89 adapted to fasten to plate 81 by the nut 90. Thus, the end plate 81 pivots about shaft 67 during winding and unwinding of spring 85. The plate 82 is not directly connected to shaft end 80 but connected through bushings 83 and bolts 84 to the plate 81 to turn the hand lever 64 and pointer 65 therewith through connecting arms 62, as described.

Securely mounted on the outermost end of shaft 67 is an arm stop 91 which engages against a lug 92, on plate 82. When the casing is turned to wind spring 85, arm 91 hits lug 92 to stop the unwinding when the casing has turned back, in the manner as herein described. A locking sealing ring or pin 93 mounts arm 91 against a sliding washer 94 which presses against the bushing (not shown) mounting gear wheel 95 on the shaft 67 adjacent the enlarged portion 80 of shaft 67. The reduction gearing arrangement comprises a balance or rocker wheel 97 povided with a pair of offset pins 98 and 99 which are in alternating engagement with the teeth of gear wheel 100 to control the speed of the unwinding action of spring 85 in conjunction with conventionally connected speed reduction gearing wheels 101, 102 and 103 coupled to wheel 95 which rotates at a speed proportional to the casing 60, indicator 65 and related clockwork B.

Opposed bearings 105 and 106 are screwed into end plates 82 and 81 respectively, to mount the ends of shaft 107 of balance wheel 97. The reduction gears 100, 101, 102 and 103 are mounted on spindles or shafts 108, 109, 110, and 111, respectively. The relative shaft ends are adapted to be mounted in suitable opposed apertures (not shown) in the end plates 81 and 82.

Interiorly of plate 81 are one or more retaining lugs 114 which extend over the spring 85. A plate 115, provided with opposed pairs of clamping lugs 116, is loosely mounted on shaft 67 and is adapted to be tightly clamped to plate 81. The integral lug or pin 74 carried by plate 115 thereby rotates with the clock casing 60 to engage arm 73 of lever 71 to kick-off latch pin 55 after a desired time interval, in the manner as herein described. The frictional engagement between shaft 67 at ring 80 and the clock mechanism B, as described, in conjunction with the tension of spring 54 permits rotation of shaft 67 and valve stem 29 to secure pin 55 in groove 59 when handle 64 is pulled and turned to wind the clock mechanism B.

In accordance with the patent statutes, we have described the principles of construction and operation of our timing valve, and while we have endeavored to set forth the best embodiment thereof, we desire to have it understood that obvious changes may be made within the scope of the following claims without departing from the spirit of our invention.

We claim:

1. A timing valve including a valve body, a valve means in said body and movable between two extreme positions, said valve body having inlet and outlet ports controlled by said valve means, means normally biasing said valve means toward one extreme position, a valve rod connected to said valve means for movement therewith, a latch on said valve rod, guide means guiding said latch longitudinally upon longitudinal movement of said valve rod, an abutment at one end of said guide means engageable with said latch in the other extreme position of said valve means to hold said valve means in its other extreme position, said latch being rotatable into and out of engagement with said abutment, a timing mechanism including two relatively rotatable parts connected by timing apparatus, means connecting one of said parts to said valve rod for movement therewith, and means connected to the other of said parts and operable to disengage said latch from said abutment.

2. The structure described in claim 1 and including a lever engageable with said latch to disengage the same from said abutment, and in which the means on the other of said parts comprises a member engageable with said lever for pivoting the same to disengage said latch from said abutment.

3. The structure described in claim 1 and including means on the other of said parts of the timing mechanism for rotating said other part through a predetermined angular distance.

4. A timing valve including a valve body, a valve member supported thereby, a valve rod connected to said valve and movable therewith between two extreme positions, means normally biasing said valve toward one extreme position, latch means on said valve rod for holding said valve in the other extreme position, limiting guide means for said latch means, lever means adjacent said guide means for releasing said latch means from said other extreme position, a clock mechanism including a driven shaft connected thereto and actuated thereby, means connecting said valve rod and driven shaft for rotation in unison, said clock mechanism being supported for rotation about the axis of said driven shaft, the clock mechanism, in operation rotating about said driven shaft axis, and arm means rotatable with said clock mechanism which is engageable with said lever means to release the said latch means from holding said valve rod in its other extreme position after a desired interval of time.

5. The structure defined in claim 4 wherein said latch means comprises pin means engageable with said lever means for limiting rotative movement of said driven shaft.

6. The structure defined in claim 4 and in which the latch means includes a fixed abutment and a cooperable member movable with said valve rod engageable with said abutment upon rotation of said valve rod.

7. The structure defined in claim 4 and in which the latch guide means is a longitudinally and transversely extended slot including a fixed abutment and said lever means is a cooperable part movable with said valve rod and engageable and disengageable upon rotation of said valve rod.

8. A timing valve including in combination a valve body, a valve means in said body movable between two extreme positions, said valve means including a valve rod, means normally biasing said valve means and said valve rod toward one extreme position, latch means on said valve rod longitudinally and rotatably movable therewith for holding said valve means in its other extreme position, guide means for guiding said latch means longitudinally upon longitudinal movement of said valve rod and rotationally upon rotational movement theref, a timing mechanism including a casing and a shaft rotatable with respect to each other, said timing mechanism including means connecting said casing and shaft to cause relative rotation therebetween, means connecting said shaft of said timing mechanism to said valve rod for movement therewith, lever means adjacent said guide means for disengaging said latch means, and arm means secured to said casing and rotatable therewith against said lever means to cause disengagement of said latch means.

9. A timing valve including a valve body, valve means in said valve body, valve stem means extending from said valve means, spring means normally biasing said valve means in one direction, pin means mounted in said valve stem, pin guide means in which said pin means moves controlling longitudinal and limiting rotational movement of said valve stem, said limiting rotational movement of said pin means in said pin guide means providing a catch means therein for holding said pin means in one longitudinal position and during limited rotational movement thereof, lever means for releasing said pin means from said catch means, a rotative timing mechanism rotatably mounted on said valve stem to turn said pin means through its limited rotation in said guide means, handle means attached to said clock mechanism to longitudinally position and rotate said pin means in said limiting guide means and relatively move said valve stem against the tensioning force of said spring means, and arm means on said timing mechanism and rotative therewith to actuate said lever means and release said pin means from said catch.

References Cited in the file of this patent

UNITED STATES PATENTS

| | | |
|---|---|---|
| 1,504,068 | Meacham | Aug. 5, 1924 |
| 2,347,201 | Lindsay | Apr. 25, 1944 |
| 2,396,809 | Addison | Mar. 19, 1946 |
| 2,498,651 | Crom | Feb. 28, 1950 |
| 2,545,928 | Martin et al. | Mar. 20, 1951 |
| 2,557,626 | Arden | June 19, 1951 |
| 2,592,024 | Goodroad et al. | Apr. 8, 1952 |